US012455184B1

(12) United States Patent
Buchmeier

(10) Patent No.: US 12,455,184 B1
(45) Date of Patent: Oct. 28, 2025

(54) METHOD FOR DETECTING THE PRESENCE OF A LIQUID IN A CONTAINER BY MEANS OF A NEAR-FIELD COMMUNICATION CIRCUIT

(71) Applicant: Continental Automotive Technologies GmbH, Hannover (DE)

(72) Inventor: Guilherme Germano Buchmeier, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 19/175,564

(22) Filed: Apr. 10, 2025

(30) Foreign Application Priority Data

Apr. 25, 2024 (FR) ........................... 2404281

(51) Int. Cl.
*G01F 23/284* (2006.01)
*B60N 3/10* (2006.01)

(52) U.S. Cl.
CPC ......... *G01F 23/2845* (2013.01); *B60N 3/102* (2013.01)

(58) Field of Classification Search
CPC ............................ G01F 23/2845; B60N 3/102
See application file for complete search history.

(56) References Cited

U.S. PATENT DOCUMENTS

| 12,020,105 | B2* | 6/2024 | Knotts | G06K 19/0716 |
| 2007/0144253 | A1* | 6/2007 | Kobayashi | G01N 35/1011 |
| | | | | 73/304 C |
| 2008/0236275 | A1* | 10/2008 | Breed | B60R 21/015 |
| | | | | 73/290 V |
| 2014/0310112 | A1* | 10/2014 | Hyde | G06Q 30/016 |
| | | | | 705/15 |
| 2015/0325916 | A1* | 11/2015 | Blodt | H01Q 7/08 |
| | | | | 343/788 |

(Continued)

FOREIGN PATENT DOCUMENTS

| EP | 3828516 A1 | 6/2021 |
| WO | 2011127334 A2 | 10/2011 |

OTHER PUBLICATIONS

French Search Report with English translation issued in corresponding Patent Application No. FR 2404281 dated Oct. 23, 2024, 22 pages.

(Continued)

*Primary Examiner* — Marcus E Windrich
(74) *Attorney, Agent, or Firm* — Buchanan Ingersoll & Rooney PC

(57) ABSTRACT

A method for detecting the presence of a liquid in a container by a near-field communication circuit that includes at least one coil surrounding the container. The method being designed to adopt a first communication mode, in which the circuit can communicate with a compatible object arranged in the container, and a second detection mode for detecting a liquid. The second detection mode including the following steps: measuring at least one so-called present physical quantity by the coil of the circuit, the present physical quantity being representative of the dielectric permittivity of the medium bounded by the container, and transmitting a signal indicating detection of a liquid in the container if the present physical quantity crosses a predetermined reference threshold.

10 Claims, 2 Drawing Sheets

(56) References Cited

U.S. PATENT DOCUMENTS

| | | | |
|---|---|---|---|
| 2016/0166096 A1* | 6/2016 | DiMaria-Ghalili | G01N 9/02 |
| | | | 702/19 |
| 2017/0250563 A1 | 8/2017 | Davison et al. | |
| 2017/0328761 A1* | 11/2017 | Schwartz | G01F 23/266 |
| 2018/0166904 A1 | 6/2018 | Pan et al. | |
| 2019/0305577 A1 | 10/2019 | Yi et al. | |
| 2022/0095688 A1* | 3/2022 | Talbot | A24F 40/51 |
| 2025/0004097 A1* | 1/2025 | Weinzierle | G01F 23/284 |
| 2025/0100733 A1* | 3/2025 | Meyhofer | B65B 25/001 |

OTHER PUBLICATIONS

Gibson, "Beware Of The Water Bottle In Your Cup Holder As It Could Be A Fire Danger", Audacy Originals via YouTube, May 25, 2023, 2 pages.

Hillel, "BMW cupholders 'not designed to hold cups filled with liquid,' according to class action lawsuit", Courthouse News Service, Dec. 16, 2021, 2 pages.

\* cited by examiner

[Fig. 1]
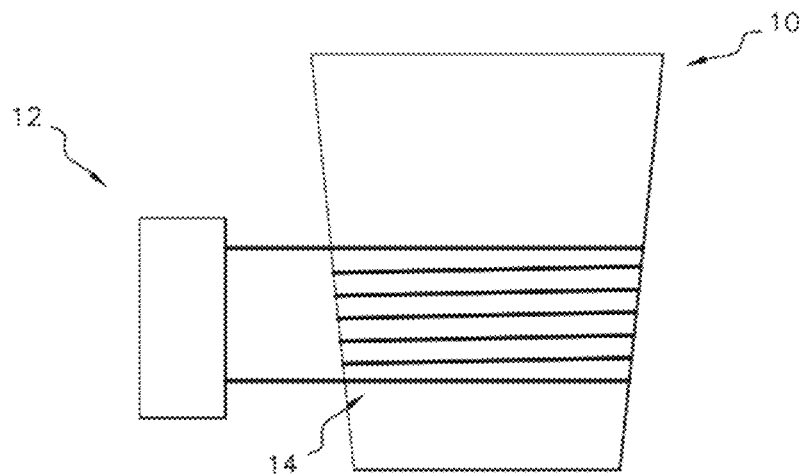
[Fig. 2]
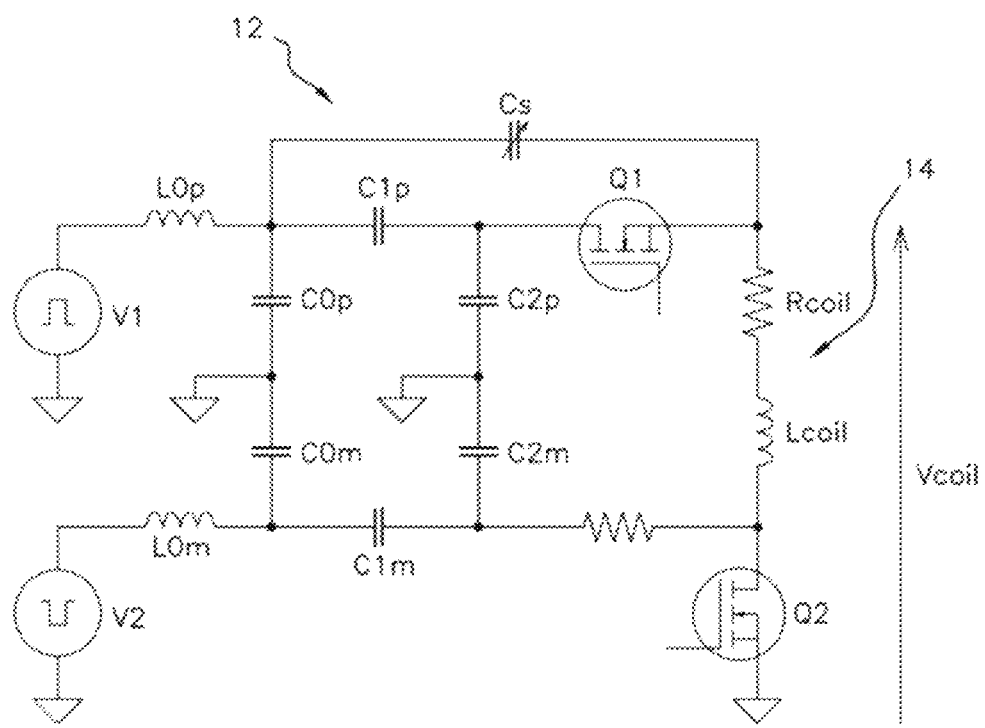

[Fig. 3]
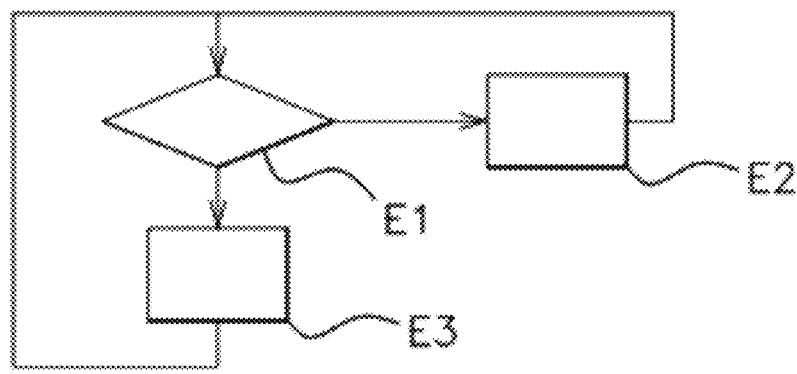
[Fig.4]
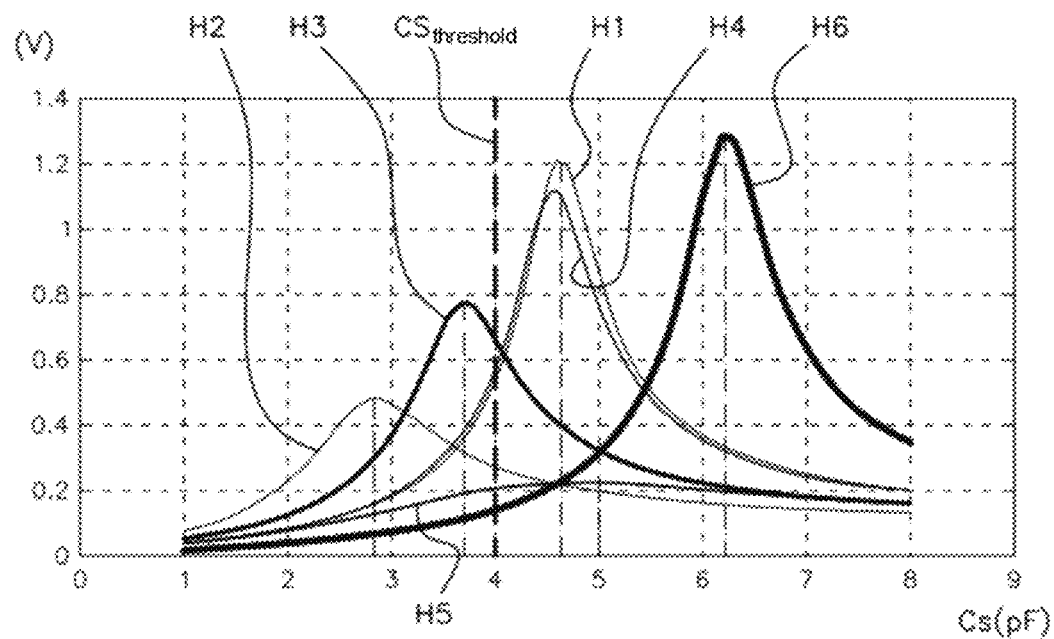

METHOD FOR DETECTING THE PRESENCE OF A LIQUID IN A CONTAINER BY MEANS OF A NEAR-FIELD COMMUNICATION CIRCUIT

CROSS REFERENCE TO RELATED APPLICATIONS

This application claims priority to French Application No. 2404281, filed Apr. 25, 2024, the contents of such application being incorporated by reference herein.

FIELD OF THE INVENTION

The present patent application relates to the field of near-field communication circuits, also called NFC circuits.

The present invention will be advantageously used, non-exclusively, in the automotive field.

BACKGROUND OF THE INVENTION

The gradual integration of near-field communication technology, often referred to as NFC for near-field communication, into the automotive industry has marked a significant evolution in the capabilities of inter-device communication, proximity sensing and wireless charging of mobile units.

It is known practice, for example, to fit a housing in the passenger compartment of a motor vehicle with a near-field communication circuit for charging a unit arranged in this housing or for communicating with this unit.

Typically, a cup holder can be fitted with a near-field communication circuit, with the result that the cup holder is suitable not only for holding beverages but also for accommodating NFC devices.

It can also be seen that the cup holders may be defective and, when exposed to liquid spills, there is a risk that the liquid will damage the electronic components beneath, such as the airbag control modules, which may lead to inadvertent deployment of the airbag.

Moreover, the prolonged presence of a bottle in the cup holder can cause a fire, especially when the plastic materials of the bottle act as a magnifying glass under the influence of sunlight, or when flammable vapors given off by disinfectant gels contained in the bottle are exposed to high temperatures.

Finally, the use of a cup holder to transport hot liquids poses a risk to driving safety, as accidental spillage could not only injure the driver or passengers but also cause loss of control of the vehicle.

The document US2017/328761A1, incorporated herein by reference, describes a level sensor system comprising a level sensor label designed to be associated with a container containing a material whose level is to be detected. The arrangement of the level sensor label features a circuit that includes an inductive element electrically connected to a capacitive structure designed to be associated with the container. However, this document does not describe a cup holder featuring a coil surrounding the container and does not envisage providing for any communication with the container or a compatible object that would replace it.

SUMMARY OF THE INVENTION

An aspect of the present invention aims in particular to provide an innovative solution to at least one of these problems by exploiting an unused capability of near-field communication technology to detect the presence and unwanted accumulation of liquids in or around a cup holder.

This aspect, as well as others that will become apparent on reading the description that follows, is achieved by a method for detecting the presence of a liquid in a container by means of a near-field communication circuit comprising at least one coil surrounding said container, said method being designed to adopt a first communication mode, in which said circuit can communicate with a compatible object arranged in the container, and a second detection mode for detecting a liquid, the second detection mode comprising the following steps:

measuring at least one so-called present physical quantity by means of the coil of the circuit, said present physical quantity being representative of the dielectric permittivity of the medium bounded by the container, and transmitting a signal indicating detection of a liquid in the container if said present physical quantity crosses a predetermined reference threshold.

By modifying the standard configuration of NFC circuits to include a system for detecting a liquid based on the variation in the dielectric permittivity of the medium bounded by the container that is caused by said liquid, an aspect of this invention provides early warning of the potential risk to electronic components and occupant safety.

Moreover, this multifunctional approach enhances the usefulness of NFC technology in vehicles, adding an additional layer of safety functionality without requiring significant hardware additions.

Thus, an aspect of the invention described here not only addresses the shortcomings of the prior art in terms of safety and protection of electronic components in vehicles, but also opens the door to new applications of NFC technology beyond wireless communication and charging, highlighting its potential as a versatile sensor.

According to other optional features of an aspect of the invention, taken alone or in combination:

said present physical quantity is measured using measurement of the resonant frequency of the coil, which is affected by the dielectric permittivity of the medium bounded by the container and therefore by the presence of a liquid in the container. This is because the resonant frequency of the coil is affected by the dielectric permittivity of the medium bounded by the cup holder and therefore by the presence of a liquid in the cup holder;

the circuit comprises a variable capacitor connected in series with the coil of the circuit, and the resonant frequency of the coil is measured by:

measuring the voltage across the terminals of the coil while varying the value of the capacitance of said variable capacitor over a range of values to obtain a voltage-time signal for each capacitance value, extracting a harmonic from each voltage-time signal to increase the accuracy of the detection of a liquid in the container, plotting the amplitude of the harmonic of the voltage as a function of the value of the capacitance, and recording the value of the capacitance that corresponds to the voltage peak of said harmonic, this value corresponding to said present physical quantity to be compared with said predetermined reference threshold to detect the presence of a liquid in the container;

the reference threshold is set on the basis of the resonant frequency of the coil when the cup holder is empty;

said extracted harmonic is the third harmonic. Switching to a higher frequency amplifies the changes caused by the presence of a liquid in the cup holder at the resonant frequency of the circuit;

the circuit comprises a first transistor connected in parallel with the variable capacitor upstream of the coil, and a second transistor connected downstream of the coil, and, to measure the voltage across the terminals of the coil when the method adopts the second detection mode, the first transistor is opened to activate the variable capacitor and the second transistor is closed to connect the coil to ground;

the method is designed to adopt a third evaluation mode for evaluating the temperature of a liquid present in the container, the third mode comprising the following steps:

measuring said so-called present physical quantity by means of the coil of the circuit, said present physical quantity being representative of the dielectric permittivity of the medium bounded by the container, and comparing said present physical quantity with a reference physical quantity to evaluate the temperature of the liquid present in the container.

An aspect of the invention also relates to a container fitted with a near-field communication circuit that comprises at least one coil surrounding said container, said circuit being designed to carry out the method described above, which comprises a first communication mode, in which said circuit can communicate with a compatible object arranged in the container, and a second detection mode for detecting the presence of a liquid in the container.

Thus, the container is a cup holder intended to be fitted in a motor vehicle.

BRIEF DESCRIPTION OF THE DRAWINGS

Other features, aims and advantages of aspects of the invention will become apparent upon reading the detailed description that follows, for the understanding of which reference will be made to the appended drawings, in which:

FIG. 1 is a schematic view of a cup holder surrounded by a coil of a near-field communication circuit according to an aspect of the invention;

FIG. 2 is a schematic view of the near-field communication circuit of FIG. 1;

FIG. 3 is a flowchart illustrating the steps of the method for detecting a liquid according to an aspect of the invention;

FIG. 4 shows curves that each illustrate the third harmonic of the voltage-time signal measured with various objects arranged in the cup holder, with the value of the variable capacitor in picofarads (pF) on the abscissa and the value of the voltage Vcoil across the terminals of the coil in volts (V) on the ordinate.

DETAILED DESCRIPTION OF EXEMPLARY EMBODIMENTS

FIG. 1 shows a cup holder 10 forming a container that is intended to be fitted in the passenger compartment of a motor vehicle.

The cup holder 10 is fitted with a near-field communication circuit 12 according to an aspect of the invention, also known as an NFC circuit.

The circuit 12, shown in FIG. 2, is designed to carry out a method for detecting the presence of a liquid in the cup holder 10, according to an aspect of the invention.

More particularly, the method according to an aspect of the invention allows the circuit 12 to adopt a first communication mode, in which the circuit 12 can communicate with a compatible object arranged in the cup holder 10, and a second detection mode, in which the circuit 12 can detect the presence of a liquid in the cup holder 10.

For this purpose, the circuit 12 has the typical basis of a conventional NFC circuit.

The expression "conventional NFC circuit" will be used hereinafter to denote an NFC circuit, or near-field communication circuit, as known according to the prior art.

This basis of the circuit 12 is provided to allow the interchange of information with compatible short-range high-frequency objects deposited in the cup holder 10, such as telephones, keys, or other electronic devices.

It will be noted that the circuit 12 is capable of wirelessly charging the battery of a compatible unit arranged in the cup holder 10.

This basis of the circuit 12 comprises a first voltage source V1 and a second voltage source V2, which each supply an AC square-wave signal voltage, a first inductor $L0p$ and a second inductor $L0m$, which, along with the associated capacitors $C0p$, $C0m$, form the main filtering elements of the circuit 12, and a plurality of capacitors $C1p$, $C1m$, $C2p$ and $C2m$, which are used to match the impedance of the circuit 12.

Typically, the natural resonant frequency of the circuit 12 is 13.56 MHz.

This basis of the circuit 12 also comprises a coil 14 that surrounds the cup holder 10 to form a spiral, as can be seen in FIG. 1, and that is symbolized in FIG. 2 by a resistor Rcoil and an inductor Lcoil.

The coil 14 is arranged so as to allow near-field data interchange with the compatible objects arranged in the cup holder 10.

In addition to this basis described above, the circuit 12 according to an aspect of the invention has additional components that are provided to allow the circuit 12 to adopt the second detection mode for detecting the presence of a liquid in the cup holder 10.

These additional components comprise a first transistor Q1 connected upstream of the coil 14, a second transistor Q2 connected downstream of the coil 14, and a variable capacitor Cs connected in series with the coil 14, upstream of the coil 14, and in parallel with the first transistor Q1.

The first transistor Q1 takes the place of a resistor typically found in a conventional NFC circuit.

Referring to the flowchart of FIG. 3, the method according to an aspect of the invention comprises an initial step E1 of detecting the presence of an object that is arranged in the cup holder 10 and that is capable of near-field communication with the circuit 12.

The initial step E1 is performed successively in a 500-millisecond cycle, for example.

If such an object is detected, the method performs a step E2, which corresponds to the first communication mode of the method, to communicate with the detected object.

Conversely, in the absence of such an object, the method moves to a step E3, which corresponds to performance of the second detection mode for detecting a liquid in the cup holder 10.

In the first communication mode, the first transistor Q1 is activated, that is to say in a conducting state in which the first transistor Q1 allows the current to flow by having a certain resistance known as the "on-state resistance", which replaces the resistor typically found in a conventional NFC circuit.

Moreover, the second transistor Q2 is deactivated, with the result that the circuit 12 behaves like a conventional NFC circuit capable of communicating with a compatible object.

The variable capacitor Cs is also adjusted to a minimum value to behave as much like an open switch as possible.

Moreover, still in the first communication mode, the first voltage source V1 and the second voltage source V2 are in phase opposition and supply power to the circuit 12.

The values of the inductors L0$p$, L0$m$ and capacitors C0$p$, C0$m$, C1$p$, C1$m$, C2$p$, C2$m$ can be calculated and adjusted by those skilled in the art to compensate for any deviations caused by the addition of the variable capacitor Cs and transistors Q1, Q2.

In the second detection mode, the first transistor Q1 is deactivated and the second transistor Q2 is activated so that the coil 14 is connected to ground.

The second voltage source V2 is also deactivated.

Therefore, the resonance of the circuit 12 is controlled by the variable capacitor Cs and the first voltage source V1, which is preferably adjusted to a low voltage to reduce the electrical consumption of the circuit 12.

The second liquid detection mode of the method comprises the following successive steps.

A so-called present physical quantity is measured by means of the coil 14 of the circuit 12, the present physical quantity being representative of the dielectric permittivity of the medium bounded by the cup holder 10.

In a preferred exemplary embodiment of the invention, the present physical quantity is measured using measurement of the resonant frequency of the coil 14, which is affected by the dielectric permittivity of the medium bounded by the cup holder 10 and therefore by the presence of a liquid in the cup holder 10.

This is because the coil 14 has a parasitic capacitance that creates a resonant frequency specific to the coil 14, this parasitic capacitance causing a shift in this resonant frequency.

It is found that the presence of liquid impacts the parasitic capacitance of the coil 14, which will therefore change the resonant frequency of the coil 14.

The higher the permittivity of the object placed in the cup holder 10, the more this object will impact the parasitic capacitance of the coil 14.

The resonant frequency of the coil 14 is measured by measuring the voltage Vcoil across the terminals of the coil 14 by means of a microcontroller (not shown) while varying the value of the capacitance of the variable capacitor Cs over a range of values to obtain a voltage-time signal for each capacitance value.

The voltage-time signal obtained is then broken down into a Fourier series to extract the third harmonic therefrom.

Varying the capacitance of the variable capacitor Cs changes the operating frequency of the circuit 12, which makes it possible to no longer use the fundamental frequency of the circuit 12 at 13.56 MHz, but rather a harmonic at a higher frequency, here the third harmonic to reach a frequency of three times the fundamental frequency, i.e. approximately 41 MHz.

This is ensured courtesy of the input signal that is in the form of a square wave, which contains multiple harmonics in its composition.

Switching to a higher frequency amplifies the changes caused by the presence of a liquid in the cup holder 10 at the resonant frequency of the circuit 12.

After the third harmonic of the voltage-time signal has been obtained, the amplitude of the harmonic of the voltage is plotted as a function of the value of the capacitance Cs as illustrated in FIG. 4.

Finally, the value Cspeak of the capacitance of the variable capacitor Cs that corresponds to the voltage peak Vpeak of the third harmonic is recorded.

This recorded value Cspeak corresponds to the present physical quantity mentioned above, which is representative of the dielectric permittivity of the medium bounded by the cup holder 10.

FIG. 4 shows curves H1, H2, H3, H4, H5 and H6 that each illustrate the third harmonic of the voltage-time signal measured with various objects arranged in the cup holder 10.

Curve H1, curve H2, curve H3, curve H4, curve H5 and curve H6 illustrate the third harmonic of the voltage-time signal measured when the cup holder 10 is empty, when the cup holder 10 contains a cup full of water, when the cup holder 10 contains a cup half-full of water, when the cup holder 10 contains a roll of adhesive tape, when the cup holder 10 contains a hand and when the cup holder 10 contains another NFC circuit, respectively.

Still based on FIG. 4, the value Cspeak of curves H1 and H4 is approximately 4.6 pF (picofarads), the value Cspeak of curve H2 is close to 3 pF, the value Cspeak of curve H3 is approximately 3.6 pF, the value Cspeak of curve H5 is approximately 5 pF and the value Cspeak of curve H6 is greater than 6 pF.

This value Cspeak is then compared with a value of a reference threshold Csthreshold by means of the microcontroller.

The value of the reference threshold Csthreshold is predetermined and is stored in a memory (not shown) of the circuit 12.

If the value Cspeak is lower than the reference threshold Csthreshold, then the cup holder 10 is considered to contain a liquid and a signal is transmitted, for example an audible signal or by displaying a message on the instrument panel of the vehicle.

The reference threshold Csthreshold is set to be between the value Cspeak of the third harmonic of the voltage-time signal measured when the cup holder 10 is empty and the third harmonic of the voltage-time signal measured when the cup holder 10 contains a certain amount of liquid, for example the equivalent of half a cup.

In our exemplary embodiment of the invention, the reference threshold Csthreshold is set to 4 pF.

To increase the accuracy of the detection of a liquid in the cup holder 10, the method has an additional phase of analyzing the value of the voltage peak Vpeak of the third harmonic of the voltage-time signal.

In our example, as can be seen on curves H1, H2, H3, H4, H5 and H6 of FIG. 4, each of which illustrates the third harmonic of the voltage-time signal, the value Vpeak of curve H1 corresponding to the empty cup holder 10 is 1.2 volts, the value Vpeak of curve H2 corresponding to the presence of a cup full of water is 0.5 volt and the value Vpeak of curve H5 corresponding to the presence of a hand is 0.2 volt.

Thus, it is found that this value Vpeak is lower when the cup holder 10 contains liquid, as illustrated by curves H2 and H3, than when the cup holder 10 contains no liquid, as illustrated by curves H1 and H4, and this value Vpeak is higher when the cup holder 10 contains liquid than when a hand is present in the cup holder 10, as illustrated by curve H5.

Likewise, again for the sake of accuracy in discerning the presence of a liquid in the cup holder 10, the method has an additional phase of analyzing the bandwidth of the voltage Vcoil measured across the terminals of the coil 14.

This is because, as can be seen in FIG. 4, it is found that when the cup holder 10 contains liquid, the bandwidth of the voltage Vcoil is less than the bandwidth of the voltage Vcoil when the cup holder 10 is empty but greater than the bandwidth of the voltage Vcoil when the cup holder 10 contains a hand.

In the exemplary embodiment of the invention described above, the measured physical quantity representative of the dielectric permittivity of the medium bounded by the cup holder 10 is the resonant frequency of the coil 14.

The method according to an aspect of the invention is designed to adopt a third evaluation mode for evaluating the temperature of a liquid present in the cup holder 10.

The third evaluation mode for evaluating the temperature comprises a first step of measuring a so-called present physical quantity by means of the coil 14 of the circuit 12, this present physical quantity being representative of the dielectric permittivity of the medium bounded by the cup holder 10.

In this exemplary embodiment of the invention, the present physical quantity is measured using measurement of the resonant frequency of the coil 14, which is affected by the dielectric permittivity of the medium bounded by the cup holder 10 and therefore by the temperature of the liquid present in the cup holder 10.

This is because it is found that the permittivity of a liquid decreases as its temperature increases.

The resonant frequency is measured in a similar manner to the measurement described above for the second detection mode of the method.

Thus, after the present resonant frequency has been measured, this present resonant frequency is compared with a reference physical quantity in order to evaluate the temperature of the liquid present in the cup holder 10.

For example, the value Cspeak corresponding to the present physical quantity as described above is compared with a predetermined reference value.

The third evaluation mode for evaluating the temperature of a liquid is particularly suitable for a cup holder that includes a heating function for heating a liquid, for example by induction.

By way of nonlimiting example, it is also possible to measure other physical quantities representative of the dielectric permittivity of the medium bounded by the cup holder 10, such as for example by measuring the impedance of the coil 14 at different frequencies.

Of course, the invention is described in the above by way of example. It should be understood that those skilled in the art will be able to produce various variant embodiments of the invention without thereby departing from the scope of the invention.

The invention claimed is:

1. A method for detecting the presence of a liquid in a container by a near-field communication (NFC) circuit that comprises at least one coil surrounding said container, said method being designed to adopt a near-field communication mode, in which said NFC circuit can detect the presence of an NFC compatible object arranged in the container, and, if an NFC compatible object is not detected in the container an NFC detection mode for detecting a liquid occurs, the NFC detection mode comprising:

measuring at least one so-called present physical quantity by the coil of the NFC circuit, said present physical quantity being representative of a dielectric permittivity of a medium bounded by the container, and transmitting at least one of an audible signal and a visual signal indicating detection of a liquid in the container if said present physical quantity crosses a predetermined reference threshold.

2. The method as claimed in claim 1, wherein said present physical quantity is measured using measurement of a resonant frequency of the coil, which is affected by the dielectric permittivity of the medium bounded by the container and therefore by the presence of a liquid in the container.

3. The method as claimed in claim 2, wherein the circuit comprises a variable capacitor connected in series with the coil of the circuit, and in that the resonant frequency of the coil is measured by:

measuring a voltage across the terminals of the coil while varying a value of a capacitance of said variable capacitor over a range of values to obtain a voltage-time signal for each capacitance value, extracting a harmonic from each voltage-time signal to increase the accuracy of the detection of a liquid in the container, plotting an amplitude of the harmonic of the voltage as a function of the value of the capacitance, and recording the value of the capacitance that corresponds to the voltage peak of said harmonic, this value corresponding to said present physical quantity to be compared with said predetermined reference threshold to detect the presence of a liquid in the container.

4. The method as claimed in claim 3, wherein the reference threshold is set on the basis of the resonant frequency of the coil when the cup holder is empty.

5. The method as claimed in claim 3, wherein said extracted harmonic is the third harmonic.

6. The method as claimed in claim 3, wherein the circuit comprises a first transistor connected in parallel with the variable capacitor upstream of the coil, and a second transistor connected downstream of the coil, and, to measure the voltage across the terminals of the coil when the method adopts the detection mode, the first transistor is opened to activate the variable capacitor and the second transistor is closed to connect the coil to ground.

7. The method as claimed in claim 1, wherein the method is designed to adopt a third evaluation mode for evaluating the temperature of a liquid present in the container, the third mode comprising:

measuring said so-called present physical quantity by the coil of the circuit, said present physical quantity being representative of the dielectric permittivity of the medium bounded by the container, and comparing said present physical quantity with a reference physical quantity to evaluate the temperature of the liquid present in the container.

8. A container fitted with a near-field communication (NFC) circuit that comprises at least one coil surrounding said container, said NFC circuit being designed to carry out the method as claimed in claim 1, which comprises a communication mode, in which said NFC circuit can communicate with an NFC compatible object arranged in the container, and a detection mode for detecting the presence of a liquid in the container.

9. The container as claimed in claim 8, wherein the container is a cup holder intended to be fitted in a motor vehicle.

10. The method as claimed in claim 4, wherein said extracted harmonic is the third harmonic.

\* \* \* \* \*